United States Patent
Moens et al.

(10) Patent No.: US 10,351,339 B1
(45) Date of Patent: Jul. 16, 2019

(54) PLASTIC BAG HOLDER

(71) Applicants: Deborah U. Moens, Evergreen, CO (US); Kenneth R. Moens, Evergreen, CO (US)

(72) Inventors: Deborah U. Moens, Evergreen, CO (US); Kenneth R. Moens, Evergreen, CO (US)

(*) Notice: Subject to any disclaimer, the term of this patent is extended or adjusted under 35 U.S.C. 154(b) by 21 days.

(21) Appl. No.: 15/900,265

(22) Filed: Feb. 20, 2018

Related U.S. Application Data

(60) Provisional application No. 62/462,206, filed on Feb. 22, 2017.

(51) Int. Cl.
  *B65F 1/14* (2006.01)
  *B65B 67/12* (2006.01)

(52) U.S. Cl.
  CPC ........ *B65F 1/1415* (2013.01); *B65B 67/1233* (2013.01); *B65B 67/1238* (2013.01); *B65F 1/1468* (2013.01); *B65F 2240/138* (2013.01); *B65F 2250/114* (2013.01)

(58) Field of Classification Search
  CPC .... B65F 1/1414; B65F 1/1415; B65F 1/1421; B65F 1/1468; B65F 2240/138; B65F 2250/114; B65F 67/12; B65F 67/1233; B65F 67/1238; B65F 67/1205; B65F 67/1255; B65F 67/1227; B65F 1/141; B65B 67/12; B65B 67/1233; B65B 67/1238; B65B 67/1205; B65B 67/1255; B65B 67/1227

USPC ..... 248/95, 97, 98, 99, 100, 101; 280/47.18, 280/47.19, 47.24, 47.26, 47.27, 47.35, 280/652; D34/5, 6
  See application file for complete search history.

(56) References Cited

U.S. PATENT DOCUMENTS

| | | | | |
|---|---|---|---|---|
| 421,075 | A * | 2/1890 | Hesner | B65B 67/12 248/97 |
| 553,455 | A * | 1/1896 | Evered | B62B 1/002 248/98 |
| 993,964 | A * | 5/1911 | Davis | B65F 1/1468 248/100 |
| 1,329,985 | A * | 2/1920 | McNaughton | B65B 67/12 248/170 |
| 1,424,026 | A * | 7/1922 | Miller | B65B 67/1205 248/100 |
| 1,427,388 | A * | 8/1922 | Holley | A47B 31/02 211/1 |
| 3,041,026 | A * | 6/1962 | Wilson | B62B 1/12 248/100 |
| 3,796,402 | A * | 3/1974 | Trotta | B65B 67/12 248/101 |

(Continued)

*Primary Examiner* — Jonathan Liu
*Assistant Examiner* — Guang H Guan
(74) *Attorney, Agent, or Firm* — Edwin H. Crabtree; Ramon L. Pizarro

(57) ABSTRACT

The subject plastic bag holder is adapted for holding a large plastic bag next to a side of a two wheel cart and on top of a base of the cart. The bag holder includes a "U" shaped ring having threaded ends for attachment to a horizontal support bar. The support bar is attached to an upper portion of a frame of the cart. The support bar and the ring included a plurality of spaced apart, upwardly extending, pins. The pins are used for attaching the plastic bag to the top of the support bar and the top of the ring for holding the bag in an open top position for receiving the yard and garden waste material therein.

17 Claims, 2 Drawing Sheets

(56) References Cited

U.S. PATENT DOCUMENTS

| | | | | |
|---|---|---|---|---|
| 3,998,415 | A * | 12/1976 | D'Antonio | B65B 67/1238 248/101 |
| 4,069,993 | A * | 1/1978 | Shanks | B65B 67/1233 248/101 |
| 4,179,132 | A * | 12/1979 | Rich | B62B 1/14 248/98 |
| 4,305,389 | A * | 12/1981 | Potter | A61M 16/0057 128/205.13 |
| 5,106,041 | A * | 4/1992 | Jelincic | B65B 67/12 141/316 |
| 5,803,299 | A * | 9/1998 | Sealy, Jr. | B65F 1/062 220/495.07 |
| 5,947,492 | A * | 9/1999 | Hallberg, Jr. | B62B 1/002 248/98 |
| 6,092,767 | A * | 7/2000 | Schrager | B65F 1/1468 248/95 |
| 8,459,515 | B1 * | 6/2013 | Weis | B62B 1/002 224/401 |
| 2006/0175475 | A1 * | 8/2006 | Desantis | B65B 67/12 248/99 |
| 2014/0151515 | A1 * | 6/2014 | Andersen | B65B 67/1227 248/97 |

* cited by examiner

PLASTIC BAG HOLDER

This non-provisional patent application claims the benefit of the subject matter and filing date of a provisional patent application, filed on Feb. 22, 2017, Ser. No. 62/462,206, titled "Plastic Bag Holder", by the subject inventors.

BACKGROUND OF THE INVENTION

(A) Field of the Invention

This invention relates to a plastic bag holder, and more particularly, but not by way of limitation, to a plastic bag holder adapted for holding a large plastic bag on a two wheel cart, when gathering and bagging pine needles, small branches, leaves, grass. trash, and other yard and garden waste items into the bag.

(B) Discussion of Prior Art

Heretofore, gardeners and home owners have used 33 to 60 gallon plastic bags for gathering leaves and other yard and garden items for disposal. Using the large plastic bags can be difficult in handling, filling and lifting. Also the gathering of leaves and yard and garden waste materials can be time consuming. The subject invention provides for ease in filling the plastic bag, the bag can be filled in less time, and using a two wheel cart, the bag can be quickly moved to an area for pick up and disposal.

SUMMARY OF THE INVENTION

In view of the foregoing, it is a primary objective of the subject invention to provide a plastic bag holder for holding a large plastic bag when filling with various lawn and garden items and can be used for trash collection as well. The bag holder can also be used for filling a large bag with other items for storage.

Another object of the invention is the bag holder is adapted for mounting on a standard two wheel cart, when filling the bag. Also, the cart is used for transporting a filled bag to a disposal area for pick up. Further, the bag holder can be incorporated into the structure of the two wheel cart.

Still another object of the invention is the bag holder greatly reduces the time and effort necessary in filling the bag with pine needles, small branches, leaves, grass and other lawn and garden items.

The subject plastic bag holder is adapted for holding a large plastic bag next to a side of a two wheel cart and on top of a base of the cart. The bag holder includes a "U" shaped ring having threaded ends for attachment to a horizontal support bar. The support bar is attached to an upper portion of a frame of the cart. The support bar and the ring include a plurality of spaced apart, upwardly extending, pins. The pins are used for attaching the plastic bag to the top of the support bar and the ring and holding the bag in an open top position for receiving a variety of yard and garden waste materials including pine needles, small branches, leaves, grass and other items therein.

These and other objects of the present invention will become apparent to those familiar with filing large plastic bags with pine needles, small branches, leaves, grass and other yard and garden waste items when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes presently devised for the practical application of the subject plastic bag holder, and in which:

FIG. 3 is a perspective view of the plastic bag attached to the bag holder with the bag filled with lawn and garden leaves and the like.

DESCRIPTION OF THE PREFERRED EMBODIMENTS

Figure 1:
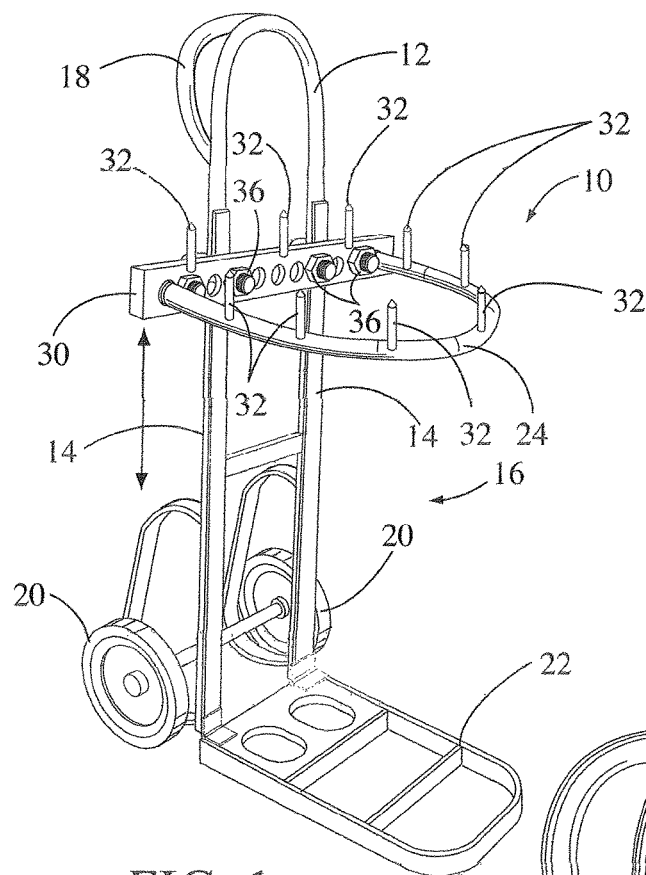
FIG. 1, a perspective view of a two wheel cart with the plastic bag holder mounted thereon.

In FIG. 1, the subject large plastic bag holder is shown having general reference numeral 10. The bag holder 10 is adapted for mounting on a top portion 12 of a frame 14, which is part of a standard, two wheel cart. The cart is shown with a general reference numeral 16 in the drawings. The cart 16 includes a handle 18, a pair of wheels 20, and a cart base 22 for holding items thereon.

The plastic bag holder 10 includes a "U" shaped ring 24, with threaded ends 26. The ring 24 can be made of hard plastic tubing, metal tubing, and the like. The ends 26 of the ring 24 are received in holes 28 on opposite ends of a horizontal support bar 30. The support bar 30 includes a plurality of spaced apart holes 28, as shown more clearly in FIG. 2.

Figure 3:
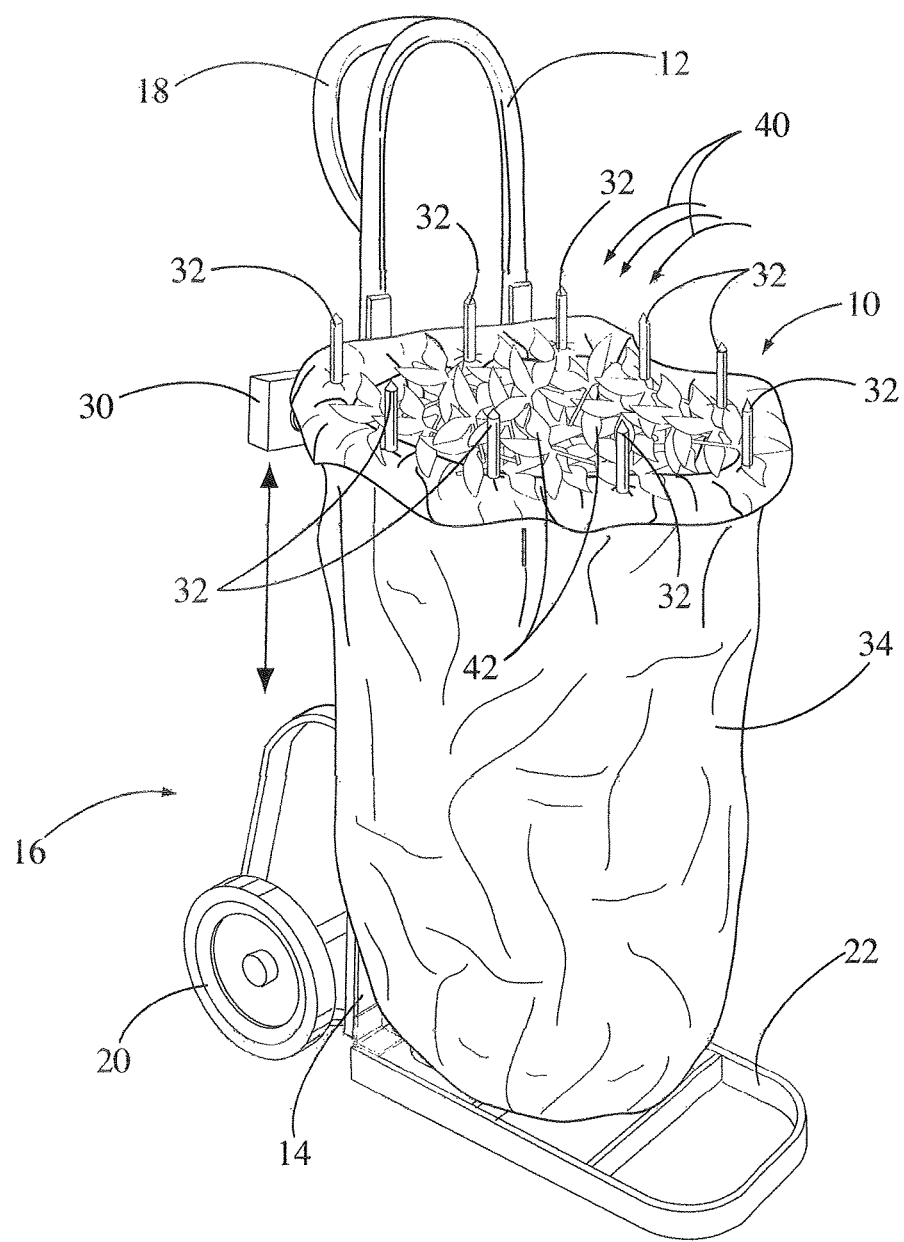

The bag holder 10 also includes a plurality of spaced apart pins 32, mounted on top of the support bar 30 and the ring 24. The pins 32 can be threaded and inserted through holes in the ring and support bar and attached thereto using threaded bolts. Also, the pins could be welded to the ring and support bar. The pins 32 are used for inserting through a top portion of a large plastic bag 34. The bag 34 is shown in FIG. 3 and suspended from the bag holder 10. The bag can typically have a size in a range of 33 to 50 gallons. The bag holder 10 can be adjusted along a length of the cart frame for different size bags 34, by adjusting the support bar 30 thereon.

Figure 2:
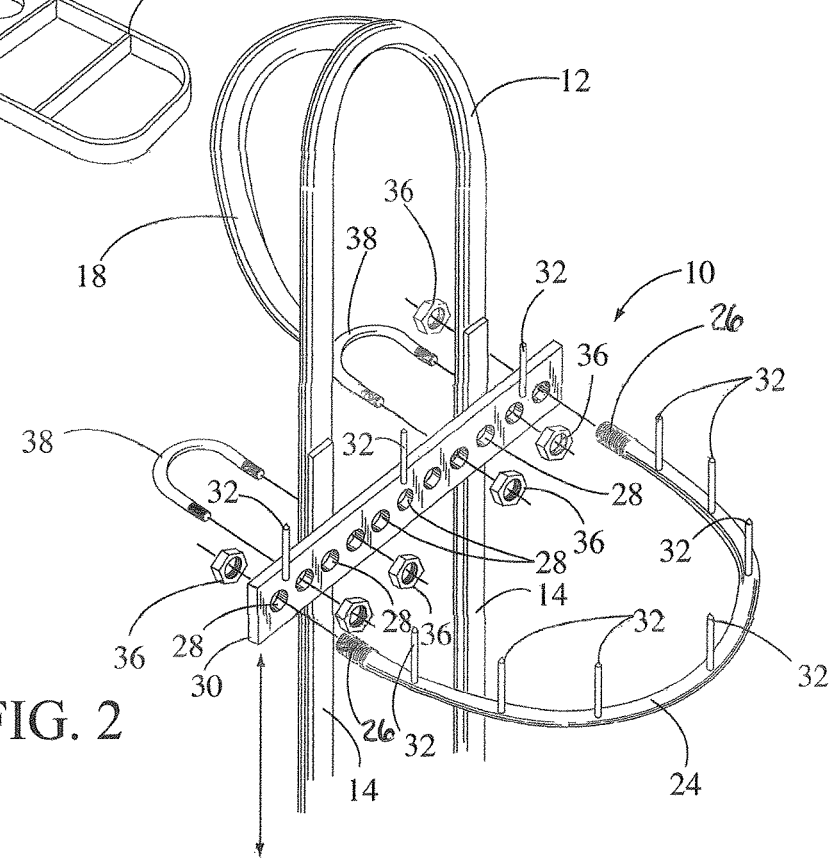
FIG. 2 is an exploded perspective view of the bag holder position for mounting to a top portion of a cart frame.

In FIG. 2, an exploded perspective view of the subject bag holder 10 is shown positioned for mounting to the top portion 12 of the cart frame 14. In this drawing, the threaded ends of the ring 24 are ready to be inserted into the holes 28, in opposite ends of the support bar 30, and attached to threaded nuts 36. Also, a pair of threaded "U" bolts 38 are shown ready to be received through a pair of holes 28 in the support bar 30 and attached to a pair of threaded nuts 36. In this manner, the bag holder 10 is secured to the top of the two wheel cart 16.

In FIG. 3, a perspective view of the plastic bag 34 is shown attached to the bag holder 10 and filled, as indicated by arrows 40, with lawn and garden waste material 42 and the like. In this drawing, a top portion of an open top in the bag 34 is shown snapped on to pins 32 and folded over the top of the ring 24 and the top of the support bar 30. The bag is held and suspended next to the frame 14 by hanging from all available pins 32 on the ring 24 and the support bar 34. Typically, the bottom of the bag will rest on top of the cart base 22.

When the bag 34 is filled, a bag tie in the top of bag can be pulled to close off the open top of the bag. At this time, the filled bag, using the two wheel cart, can be transported to a disposal area.

While the invention has been particularly shown, described and illustrated in detail with reference to the preferred embodiments and modifications thereof, it should be understood by those skilled in the art that equivalent changes in form and detail may be made therein without departing from the true spirit and scope of the subject bag holder as claimed except as precluded by the prior art.

The invention claimed is:

1. A plastic bag holder for holding a plastic bag, the plastic bag holder comprising:
    a horizontal support bar, wherein the horizontal support bar is configured to be attached to a cart frame of a two-wheel cart, wherein the horizontal support bar comprises a first attachment hole, a second attachment hole, a first set of securement holes, a second set of securement holes, and a plurality of intermediate holes arranged between the first and second sets of securement holes, wherein the first and second sets of securement holes are arranged between the first and second attachment holes, wherein the first and second attachment holes, the first and second sets of securement holes, and the plurality of intermediate holes are spaced apart holes;
    a U-shaped ring, wherein the U-shaped ring comprises a first threaded end and a second threaded end opposite the first threaded end, wherein the first threaded end is received within the first attachment hole and fastened to the horizontal support bar, wherein the second threaded end is received within the second attachment hole and fastened to the horizontal support bar;
    a first U-shaped bolt, wherein the first U-shaped bolt is received within the first set of securement holes to secure the horizontal support bar to the cart frame with a first plurality of fasteners;
    a second U-shaped bolt, wherein the second U-shaped bolt is received within the second set of securement holes to secure the horizontal support bar to the cart frame with a second plurality of fasteners;
    a first plurality of upwardly extending pins, wherein the first plurality of upwardly extending pins are attached to the horizontal support bar and substantially equally spaced apart along a longitudinal length of the horizontal support bar; and
    a second plurality of upwardly extending pins, wherein the second plurality of upwardly extending pins are attached to the U-shaped ring and substantially equally spaced apart along a length of the U-shaped ring between the first and second threaded ends;
    wherein the first and second pluralities of upwardly extending pins are configured to hold a top portion of the plastic bag, such that the U-shaped ring and the horizontal support bar are configured to hold the plastic bag in an open position for receiving lawn and garden waste materials.

2. The plastic bag holder as described in claim 1, wherein each of the first plurality of upwardly extending pins is welded to the horizontal support bar.

3. The plastic bag holder as described in claim 1, wherein each of the second plurality of upwardly extending pins is welded to the U-shaped ring.

4. The plastic bag holder as described in claim 1, wherein each of the second plurality of upwardly extending pins is threadedly attached to the U-shaped ring.

5. The plastic bag holder as described in claim 1, wherein each of the first plurality of upwardly extending pins is a substantially vertically extending pin.

6. The plastic bag holder as described in claim 1, wherein each of the first plurality of upwardly extending pins comprises a pointed end configured to be inserted through the top portion of the plastic bag.

7. The plastic bag holder as described in claim 1, wherein the first plurality of upwardly extending pins are attached to a front surface of the horizontal support bar.

8. The plastic bag holder as described in claim 1, wherein each of the second plurality of upwardly extending pins is a substantially vertically extending pin.

9. The plastic bag holder as described in claim 1, wherein each of the second plurality of upwardly extending pins comprises a pointed end configured to be inserted through the top portion of the plastic bag.

10. The plastic bag holder as described in claim 1 further comprising the first plurality of fasteners, wherein the first plurality of fasteners comprise threaded nuts coupled to threaded ends of the first U-shaped bolt to secure the horizontal support bar to the cart frame.

11. The plastic bag holder as described in claim 10 further comprising the second plurality of fasteners, wherein the second plurality of fasteners comprise threaded nuts coupled to threaded ends of the second U-shaped bolt to secure the horizontal support bar to the cart frame.

12. The plastic bag holder as described in claim 1, wherein the U-shaped ring is made of a hard plastic tubing or a metal tubing.

13. The plastic bag holder as described in claim 1, wherein the first threaded end of the U-shaped ring is fastened to the horizontal support bar with a first threaded nut.

14. The plastic bag holder as described in claim 13, wherein the second threaded end of the U-shaped ring is fastened to the horizontal support bar with a second threaded nut.

15. The plastic bag holder as described in claim 1, wherein an entirety of the U-shaped ring defines a "U" shape.

16. The plastic bag holder as described in claim 1, wherein the plastic bag holder is configured to be adjusted along a length of the cart frame for bags of different sizes.

17. A plastic bag holding system comprising:
    a two-wheel cart; and
    the plastic bag holder as described in claim 1, wherein the plastic bag holder is secured to the two-wheel cart.

* * * * *